(12) United States Patent
Lin et al.

(10) Patent No.: US 6,748,459 B1
(45) Date of Patent: Jun. 8, 2004

(54) METHOD AND APPARATUS FOR ADDRESS MAPPING

(75) Inventors: Shing Mark Lin, Palo Alto, CA (US); Yen-Chung Lin, Saratoga, CA (US)

(73) Assignee: Adaptec, Inc., Milpitas, CA (US)

( * ) Notice: Subject to any disclaimer, the term of this patent is extended or adjusted under 35 U.S.C. 154(b) by 284 days.

(21) Appl. No.: 09/690,120

(22) Filed: Oct. 12, 2000

(51) Int. Cl.7 .............................. G06F 3/00; G06F 13/14
(52) U.S. Cl. .............................. 710/3; 710/64; 710/10; 710/305; 710/315; 709/222
(58) Field of Search .............................. 710/62, 64, 75, 710/5, 10, 36, 74, 305, 315; 709/222

(56) References Cited

U.S. PATENT DOCUMENTS

| | | | |
|---|---|---|---|
| 5,954,796 A | * 9/1999 | McCarty et al. | 709/222 |
| 5,996,024 A | 11/1999 | Blumenau | |
| 6,041,381 A | * 3/2000 | Hoese | 710/315 |
| 6,209,023 B1 | * 3/2001 | Dimitroff et al. | 710/74 |
| 6,430,645 B1 | * 8/2002 | Basham | 710/5 |

OTHER PUBLICATIONS

Vineet M. Abraham and Robert D. Russell, "Design, Implementation and Evaluation Of a Fiber Channel Driver For IP On Linux," http://www.cs.unh.edu/~rdr/tr9906.pdf, Jul. 28, 1999.

* cited by examiner

Primary Examiner—Kim Huynh
(74) Attorney, Agent, or Firm—Martine & Penilla, LLP

(57) ABSTRACT

An invention is disclosed that maps a Fibre Channel address to a Small Computer System Interface (SCSI) address. A data port is detected on a computer network system and a port target identifier is assigned to the detected data port. Next, a device coupled to the data port is detected and a logical unit identifier is assigned to the detected device. In addition, an Arbitrated Loop Physical Address (AL_PA) is obtained for the device. Further, an address database is constructed that includes a device entry for the detected device. The device entry includes the port target identifier and the logical unit identifier that were assigned to the data port and device. In addition, the device entry associates the AL_PA to the port target identifier and the logical unit identifier of the device.

17 Claims, 12 Drawing Sheets

METHOD AND APPARATUS FOR ADDRESS MAPPING

CROSS REFERENCE TO RELATED APPLICATIONS

This application is related to U.S. patent application Ser. No. 09/687,658, filed Oct. 12, 2000, entitled "METHOD AND APPARATUS FOR COMMON HARDWARE INTFACE MODULES," the disclosure of which is hereby incorporated by reference in its entirety.

This application is related to U.S. patent application Ser. No. 09/687,244, filed Oct. 12, 2000, entitled "METHOD AND APPARATUS FOR ESTABLISHING A PROFILE TABLE FOR HOST BUS ADAPTERS," the disclosure of which is hereby incorporated by reference in its entirety.

This application is also related to U.S. patent application Ser. No. 09/687,699, filed Oct. 12, 2000, entitled "METHOD AND APPARATUS FOR DEVICE DISCOVERY," the disclosure of which is hereby incorporated by reference in its entirety.

This application is also related to U.S. patent application Ser. No. 09/687,623, filed Oct. 12, 2000, entitled "METHOD AND APPARATUS FOR A LAYER STRUCTURE DIRECTORY FOR COMMON HARDWARE INTERFACE MODULES," the disclosure of which is hereby incorporated by reference in its entirety.

BACKGROUND OF THE INVENTION

1. Field of the Invention

This invention relates generally to computer networking, and more particularly to a common hardware interface for communication within a Fibre Channel network environment.

2. Description of the Related Art

Conventionally, to provide an interface to hardware devices, software designers often utilize device drivers designed for specific hardware devices. A device driver is a named entity that supports basic I/O functions, such as read, write, get configuration, and set configuration, and typically, also uses and manages interrupts from a device as well.

A device driver is used to provide access to a device from application code in as general purpose a fashion as reasonable, while being as efficient as possible. The interface for a device driver typically is generic and device driver independent, however, the actual driver implementation is completely up to the device driver designer.

As mentioned above, most device drivers are concerned with the movement of information, for example data bytes along a serial interface, or packets in a network. Interrupts typically are used in order to make the most efficient use of system resources, which allows for other application processing to take place, while the data transfers are underway, with the interrupts used to indicate when various events have occurred.

For example, a serial port typically generates an interrupt after a character has been sent "down the wire" and the interface is ready for another. While the data is being sent, further application processing should be allowed since the data transfer can take quite a long time. To allow further application processing, an interrupt is generally used to "alert" the driver and allow the driver to send a new character as soon as the current one is complete, without any active participation by the application code.

One of the first storage and interconnect technologies to utilize device drivers was the Small Computer Systems Interface (SCSI), which is an intelligent, parallel I/O bus on which various peripheral devices and controllers exchange information. Because of its longevity in the marketplace, the parallel SCSI provides a large depth and breadth of products, which include SCSI disk drives, CD-ROM, RAID subsystems, scanners, and other products that are available from a multitude of sources.

To obtain the benefits of the SCSI I/O performance, computer systems use SCSI controllers. A SCSI controller is a hardware device that provides communication with a SCSI network. Communication with the SCSI controller generally is accomplished using a SCSI device driver.

FIG. 1 is a block diagram showing a prior art SCSI system 100. The SCSI system 100 includes an application program 102, a SCSI controller 108, SCSI drives 110, and a SCSI device driver comprising an operating system module (OSM) 104 and a common hardware interface module (CHIM) 106. As explained in greater detail subsequently, typically the OSM is operating system dependent, while the CHIM is operating system independent.

During operation the application program 102 executes on a particular operating system, such as WINDOWS 95, and accesses networked SCSI devices, such as the SCSI drives 110, using the SCSI device driver. Specifically, when the application program 102 requires access to a SCSI device, such as the SCSI drives 110, the application program 102 passes a device access command to the SCSI device driver via the OSM 104 section of the SCSI device driver.

Since the OSM 104 is operating system dependent, the OSM 104 varies depending on the type of operating system the application 102 is executing on. Hence, to use the OSM 104 in combination with an application 102 executing on a NT4.0 operating system, the OSM should be designed specifically for the NT4.0 operating system. As shown in FIG. 1, the OSM 104 can be designed as a NT4.0 OSM 112, a WINDOWS 95 OSM 114, a Linux OSM 116, a VX Work OSM 118, a MAC OSM 120, or any other operating system OSM. In this example, since the application 102 is executing on a WINDOWS 95 operating system, the OSM 104 would actually be a WINDOWS 95 OSM 114.

When the OSM 104 receives the operating system specific device access command, the OSM 104 translates the command in system independent CHIM device access command for the common hardware interface module (CHIM) 106 portion of the SCSI device driver, and passes the translated command to the CHIM 106.

Thus, an OSM 104 is written for a specific operating system and completely isolates the CHIM 106 from the host operating system. Typically, the OSM 104 presents device driver entry points that are specific to the particular operating system and converts them to operating system independent calls to the CHIM 106. Thus, when the operating system calls the driver's initialization entry points, the OSM 104 makes a series of calls to the CHIM 106 that allow the CHIM 106 to check for the presence of adapter hardware, initialize the adapter, and access connected devices.

The CHIM 106 is an operating system independent common hardware interface module that receives CHIM commands and translates the CHIM commands into commands for the SCSI controller 108.

Whereas the OSM 104 isolates the CHIM 106 from the operating system, the CHIM 106 isolates the OSM 104 from the SCSI controller 108 hardware. The CHIM 106 initializes the SCSI controller 108 hardware, builds commands in the correct format for the adapter, and performs command delivery.

In use, The OSM 104 provides a protocol-specific command, such as a SCSI Command Descriptor Block (CDB), to the CHIM 106. After receiving the command from the CHIM 106, the SCSI controller 108 accesses the SCSI drives 110 using the SCSI protocol.

The problem with the prior art SCSI system 100 is that SCSI protocol is often not fast enough to support many modem application needs. The limitations for SCSI in terms of bus speed, reliability, cost, and device count are leading systems and storage designers to look toward serial device interfaces that feature higher data transfer rates.

One such serial device interface is Fibre Channel, which provides a high-speed data transfer interface that can be used to connect systems and storage in point-to-point, switched, or Loop topologies. In addition, the Fibre Channel Arbitrated Loop can support copper media and loops having 126 devices, or nodes.

FIG. 2 is a block diagram illustrating a conventional Fibre Channel system 200. The Fibre Channel system 200 includes a Port Driver 202, a Fibre Channel driver 204, a Fibre Channel controller 206, and a network device 208. In use, the port driver passes device access commands to the Fibre Channel driver 204, which facilitates communication between the port driver 202 and the Fibre Channel controller 206.

The Fibre Channel driver 204 operates similar to the device drivers discussed previously. Broadly speaking, the Fibre Channel driver 204 provides access to the Fibre Channel controller 206 in as general purpose a fashion as reasonable while being as efficient as possible. Generally, the Fibre Channel controller 206 accesses the network device 208 using a Fibre Channel protocol.

In a Fibre Channel Arbitrated Loop configuration, when a device is ready to transmit data, the device initially arbitrates and gains control of the Loop. Typically, the device accomplishes this by transmitting an Arbitrate (ARBx) Primitive Signal, where x=the Arbitrated Loop Physical Address (AL_PA) of the device. Once a device receives its own ARBx Primitive Signal, the device has gained control of the Loop and can then communicate with other devices by transmitting an Open (OPN) Primitive Signal to a destination device. Once this happens, there essentially exists point-to-point communication between devices.

If more than one device on the Loop is arbitrating at the same time, the x values of the ARB Primitive Signals are compared. When an arbitrating device receives another device's ARBx, the ARBx with the numerically lower AL_PA is forwarded, while the ARBx with the numerically higher AL_PA is blocked. Thus, the device with the lower AL_PA generally gains control of the Loop first. Then, once the device relinquishes control of the Loop, the other device can gain control of the Loop.

Unlike token-passing schemes, there generally is not limit on how long a device may retain control of the Loop. This demonstrates the "channel" aspect of Fibre Channel. There is, however, an optional Access Fairness Algorithm, which prohibits a device from arbitrating again until all other devices have had a chance to arbitrate.

In addition to Fibre Channel's strong channel characteristics, Fibre Channel also provides powerful networking capabilities, allowing switches and hubs to enable the interconnection of systems and storage into tightly-knit clusters. These clusters are capable of providing high levels of performance for file service, database management, or general purpose computing. Moreover, because Fibre Channel is able to span 10 kilometers between nodes, Fibre Channel allows the very high speed movement of data between systems that are greatly separated from one another.

Because of Fibre Channel's superior performance and networking capabilities, and Fibre Channel's broad industry support, Fibre Channel is in great demand. However, one problem with Fibre Channel is that many networks are currently configured for use with a SCSI protocol. Thus, in addition to physical connections, the overlying network software typically must be replaced to convert these networks to Fibre Channel. However, the cost of designing a completely new software system and replacing old software systems is tremendous.

In view of the forgoing, there is a need for a Fibre Channel interfacing system that is capable of being incorporated into existing SCSI software networks with little additional cost. The system should incorporate a large portion of the existing system software and not require current network application programs to be replaced.

SUMMARY OF THE INVENTION

Broadly speaking, the present invention fills these needs by providing a method for mapping a Fibre Channel address to a Small Computer System Interface (SCSI) address. Initially, a data port is detected on a computer network system and a port target identifier is assigned to the detected data port. Next, a device coupled to the data port is detected and a logical unit identifier is assigned to the detected device. In addition, an Arbitrated Loop Physical Address (AL_PA) is obtained for the device. Further, an address database is constructed that includes a device entry for the detected device. The device entry includes the port target identifier and the logical unit identifier that were assigned to the data port and device. In addition, the device entry associates the AL_PA to the port target identifier and the logical unit identifier of the device.

In another embodiment, an address database for mapping a Fibre Channel address to a Small Computer System Interface (SCSI) address is disclosed. The address database includes a port target identifier related to a data port, and a logical unit identifier related to a device that is coupled to the data port. In addition, the address database includes an Arbitrated Loop Physical Address (AL_PA), which is also related to the device.

In a further embodiment, a computer program is disclosed that maps a Fibre Channel address to a Small Computer System Interface (SCSI) address. The computer program includes a code segment that detects a data port oh a computer network system, and a code segment that assigns a port target identifier to the detected data port. The computer program also includes a code segment that detects a device coupled to the data port, and a code segment that assigns a logical unit identifier to the detected device. In addition, a code segment is included that obtains an Arbitrated Loop Physical Address (AL_PA) for the device. The computer program further includes a code segment that constructs an address database that includes a device entry for the detected device. The device entry includes the port target identifier and the logical unit identifier of the detected device. The device entry also associates the AL_PA with the port target identifier and the logical unit identifier.

Advantageously, embodiments of the present invention allow SCSI based applications to access network devices on the Fibre Channel network using SCSI based commands, which have port target IDs and a LUN IDs that identify the network devices. The Fibre Channel Driver of the present invention can then translate the port target ID and the LUN ID into a corresponding AL_PA to actually access the device on the Fibre Channel network.

Further, by dividing the Fibre Channel driver into an OSM and a FCHIM, Fibre Channel driver of the present invention can be efficiently upgraded to match operating system changes without redesigning the entire driver.

Moreover, because the FCHIM is generally capable of accepting CHIM commands, embodiments of the present invention allows many existing SCSI based network applications to operate over a Fibre Channel network with little or no modification to the applications or the associated OSMs.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

The present invention provides a method for mapping a Fibre Channel address to a Small Computer System Interface (SCSI) address. Embodiments of the present invention allow SCSI based applications to access network devices on the Fibre Channel network using SCSI based commands, which have port target IDs and a LUN IDs that identify the network devices.

In the following description, the term host adapter and controller have been used synonymously. The following description and appended claims apply equally to all configurations of a controller, whether the controller is integrated onto a printer circuit board to form a host adapter, integrated directly to a computer motherboard, or in any other comparable configuration. Further, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
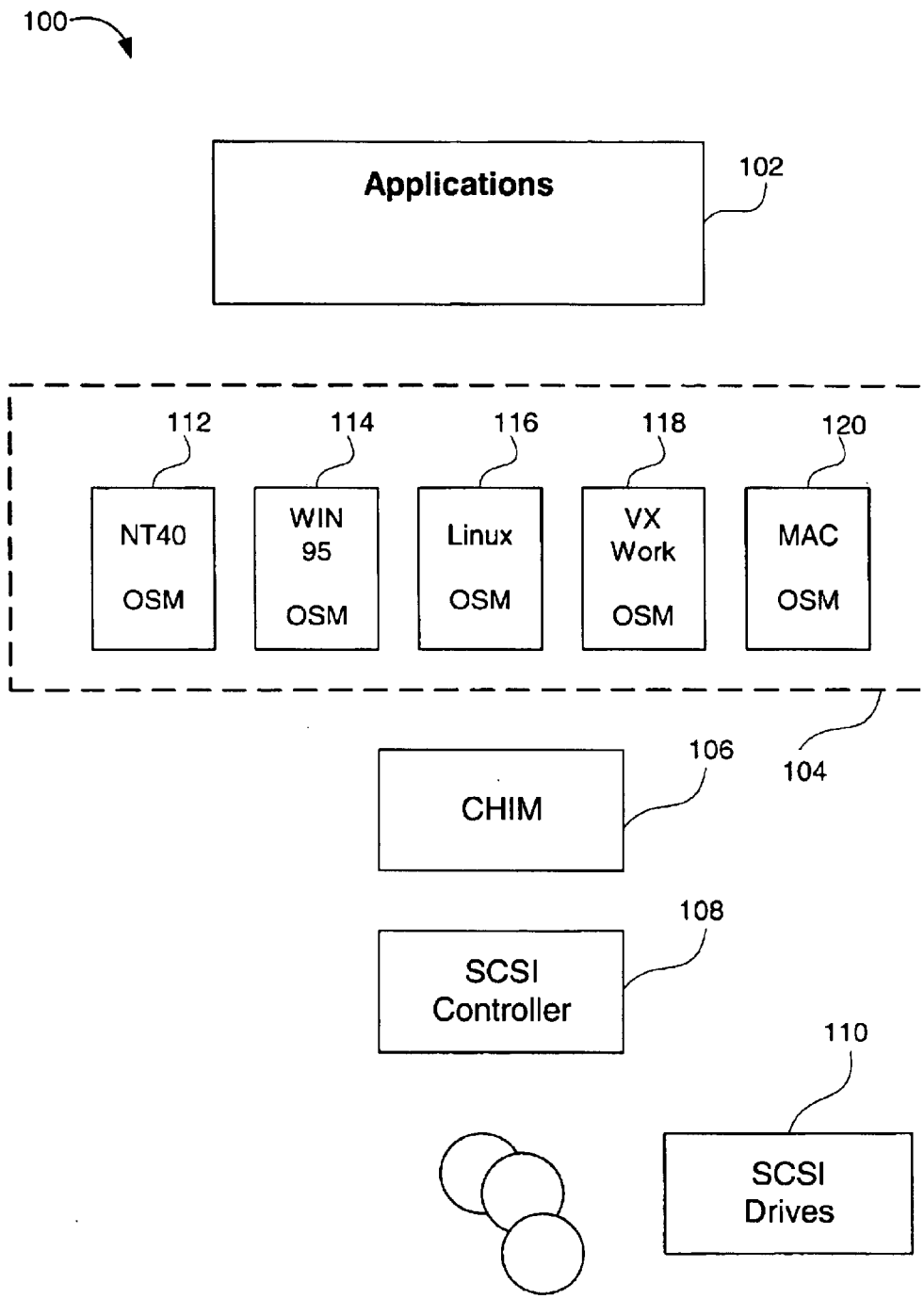
FIG. 1 is a block diagram showing a prior art SCSI system.
Figure 2:
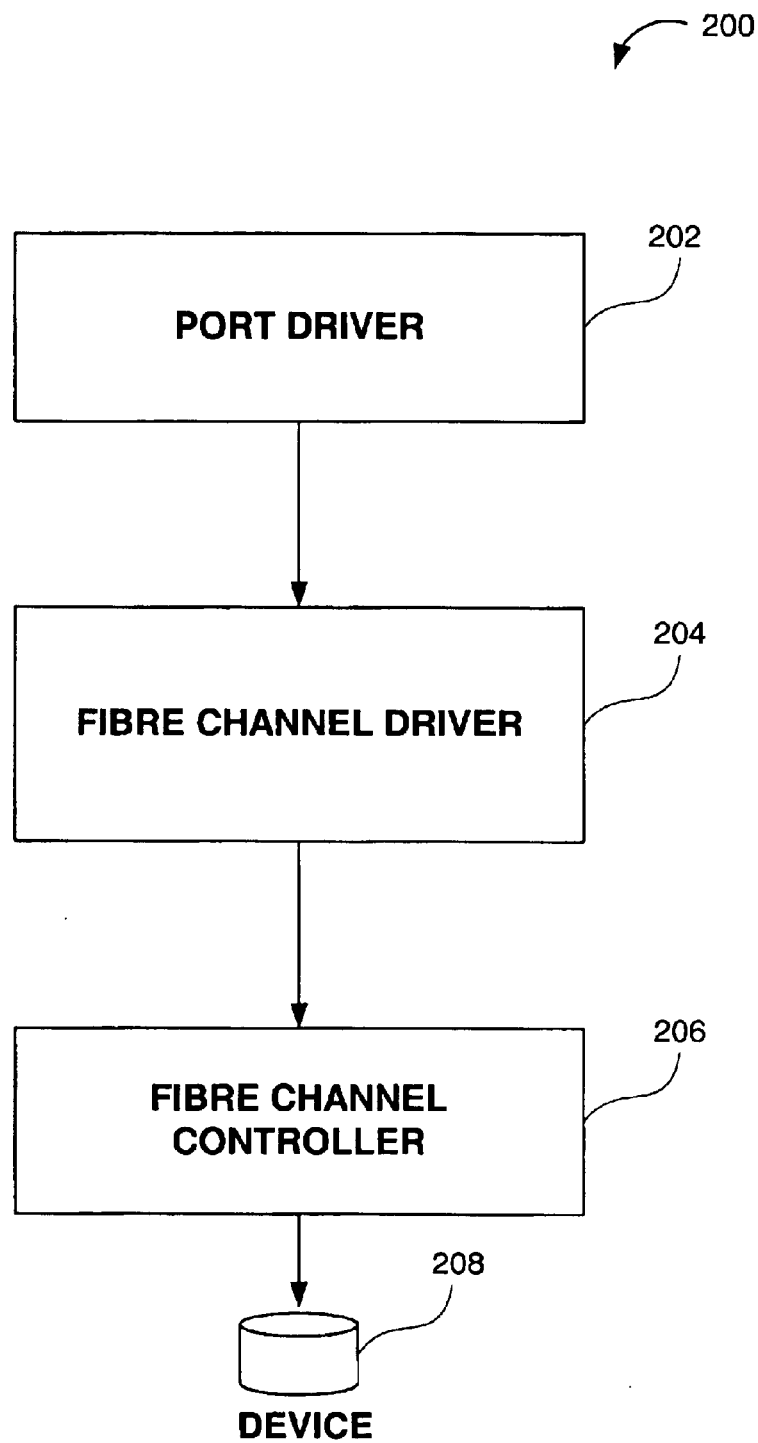
FIG. 2 is a block diagram illustrating a conventions Fibre Channel system.
Figure 3A:
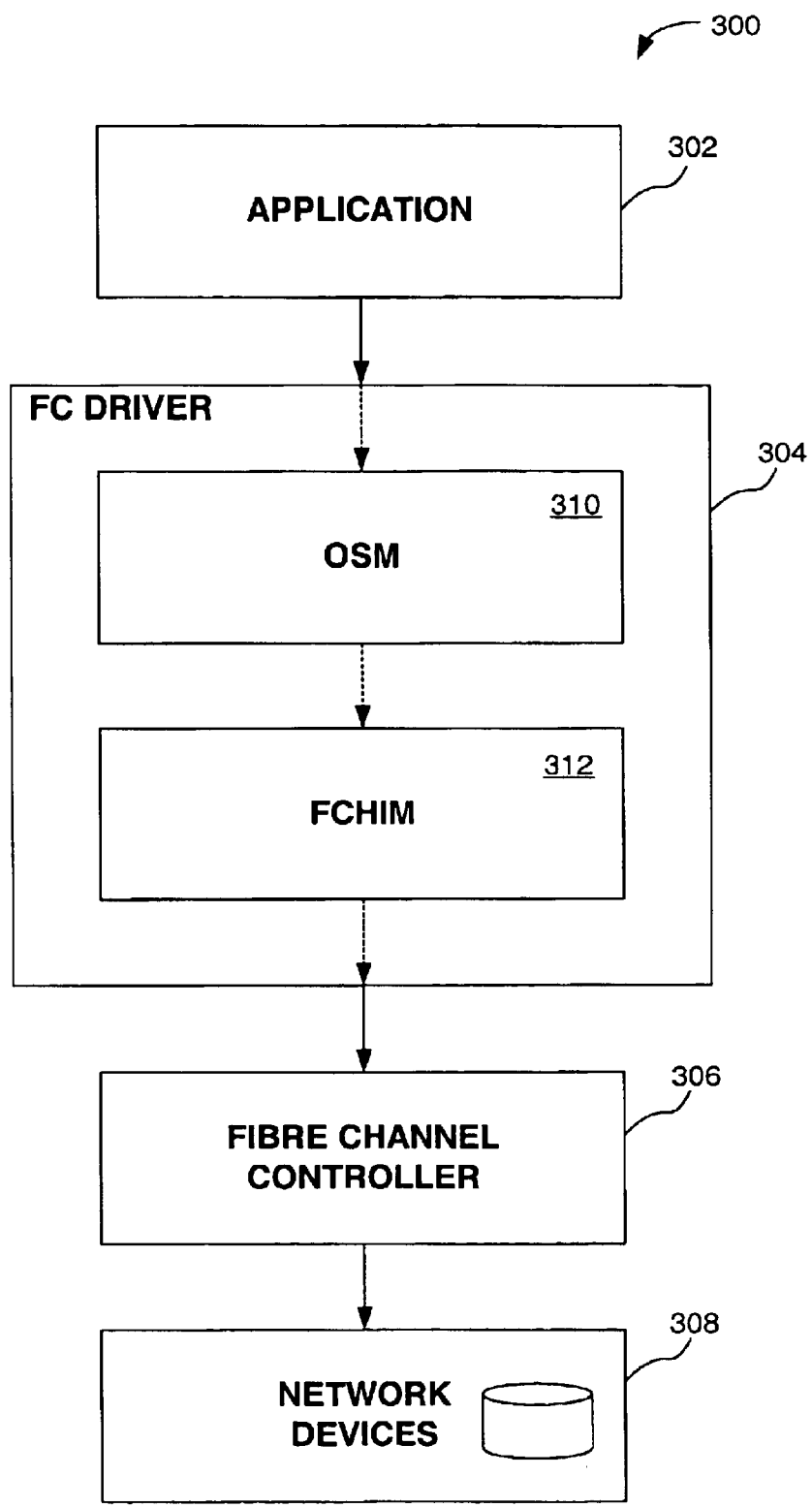
FIG. 3A is a block diagram of a Fibre Channel system, in accordance with an embodiment of the present invention.

FIGS. 1 and 2 were described in terms of the prior art. FIG. 3A is a block diagram of a Fibre Channel system 300, in accordance with an embodiment of the present invention. The Fibre Channel system 300 includes an application program 302 and a Fibre Channel driver 304, which provides an interface to a Fibre Channel controller 306.

The application program 302 executes on a particular operating system, such as WINDOWS 95, and passes operating system specific device access commands to the Fibre Channel driver 304 when the application program 30Q2 requires access a network device 308. The Fibre Channel driver 304 translates the device access command and passes the command to the Fibre Channel controller 306, which accesses the network device 308 via a Fibre Channel network.

To provide the above-mentioned interface, the Fibre Channel driver 304 includes an operating system module (OSM) 310 and a Fibre Channel Hardware Interface Module (FCHIM) 312. The OSM 310 is an operating system dependent code module designed for a specific operating system. In operation, the OSM 310 receives operating system specific commands from the application program 302 and translates the commands into operating system independent FCHIM commands.

In this manner, the OSM 310 completely isolates the FCHIM 312 from the host operating system and application program 302. Specifically, the OSM 310 presents device driver entry points that are specific to the particular operating system and converts them into operating system independent calls to the FCHIM 312. When the operating system calls the driver's initialization entry points, the OSM 310 makes a series of calls to the FCHIM 312 that allow the FCHIM 312 to check for the presence of adapter hardware 306, initialize the adapter, allocate memory, and perform other initialization operations. In one embodiment, the OSM 310 also builds a standard I/O Block (IOB) and passes it to the FCHIM 312 for execution when the operating system issues I/O requests to the Fibre Channel driver 304.

The OSM 310 also provides an operating system independent set of utility functions to the FCHIM 312. Examples include functions that translate virtual addresses into bus addresses, read and write I/O and memory-mapped registers, and create a watchdog timer. These functions fully isolate the FCHIM 312 from the operating system environment allowing the FCHIM 312 to be ported across platforms.

The FCHIM 312 is an operating system independent common hardware interface module that receives FCHIM commands and translates the FCHIM commands into Fibre Channel commands for the Fibre Channel controller 306. Whereas the OSM 310 isolates the FCHIM 312 from the operating system, the FCHIM 312 isolates the OSM 310 from the Fibre Channel controller 306 hardware. The FCHIM 306 initializes the Fibre Channel controller 306 hardware and connected transport, builds commands in the correct format for the adapter, performs command delivery, and performs error handling specific to the adapter hardware 306 and attached transport.

In one embodiment, the OSM 310 provides a protocol-specific command, such as a Fibre Channel Command Descriptor Block (CDB), to the FCHIM 312 as part of the IOB. In this embodiment, software that is specific to the transport is encapsulated within the FCHIM 312. After receiving the command from the FCHIM 312, the Fibre Channel controller 306 accesses the network drives 308 using a Fibre Channel protocol.

Advantageously, by dividing the Fibre Channel driver 304 into the OSM 310 and the FCHIM 312, an embodiment of the present invention allows efficient upgrading of the Fibre Channel driver 304 to match operating system changes without redesigning the entire driver. Since the OSM 310 may be changed without needing to alter the FCHIM 312, the OSM 310 software code can be separately compiled and linked to an existing FCHIM 312 object module, as described in greater detail subsequently.

Figure 3B:
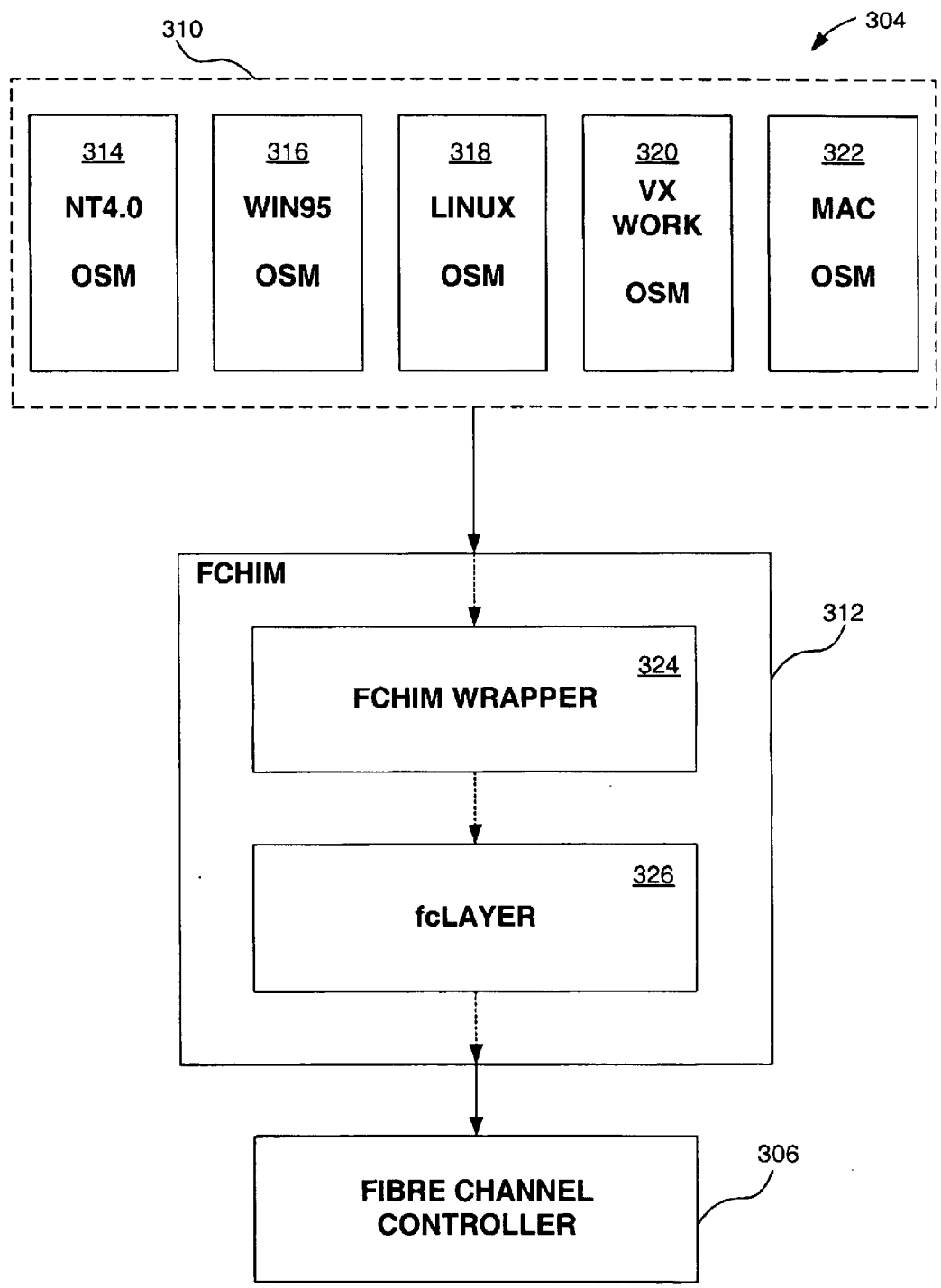
FIG. 3B is block diagram showing a Fibre Channel driver, in accordance with an embodiment of the present invention.

FIG. 3B is block diagram showing a Fibre Channel driver 304, in accordance with an embodiment of the present invention. The Fibre Channel driver 304 includes an OSM 310 and a FCHIM 312. As stated previously, the OSM 310 is operating system dependent, thus the OSM 310 varies depending on the type of operating system the application is executing on. Hence, to utilize the Fibre Channel driver 304 in combination with an application that is executed on a NT4.0 operating system, the OSM should be designed specifically for the NT4.0 operating system. As shown in FIG. 3B, exemplary operating system dependent OSMs 310 include NT4.0 OSM 314, a WINDOWS 95 OSM 316, a Linux OSM 318, a VX Work OSM 320, a MAC OSM 322, or any other computer operating system OSM. As mentioned previously, during operation the OSM 310 receives operating system specific device access commands from an application program, and translates the received commands into an operating system independent FCHIM device access commands, which are passed to the FCHIM 312.

The FCHIM 312 comprises a Fibre Channel Wrapper module 324 and a Fibre Channel layer module 326. The FCHIM Wrapper module 324 receives the operating system independent FCHIM device access commands from the OSM 310 and translates the commands into fcCommon commands for the Fibre Channel layer module 326, which accepts the fcCommon commands and uses the commands to control the Fibre Channel controller 306.

Because the FCHIM 312 is generally capable of accepting CHIM commands, the FCHIM 312 of the present invention is further capable of communicating with conventional OSMs, such as the OSMs described with reference to FIG. 1. Advantageously, this capability allows an embodiment of the present invention to be used with existing software with little or no modification. For example, since the FCHIM 312 also accepts the CHIM commands, the application discussed with reference to FIG. 1 can be executed in a Fibre Channel environment using the present invention. Thus, the FCHIM Wrapper module 324 of the present invention can provide a transparent interface between SCSI and Fibre Channel, as discussed next with reference to FIGS. 4 and 5.

Figure 4:
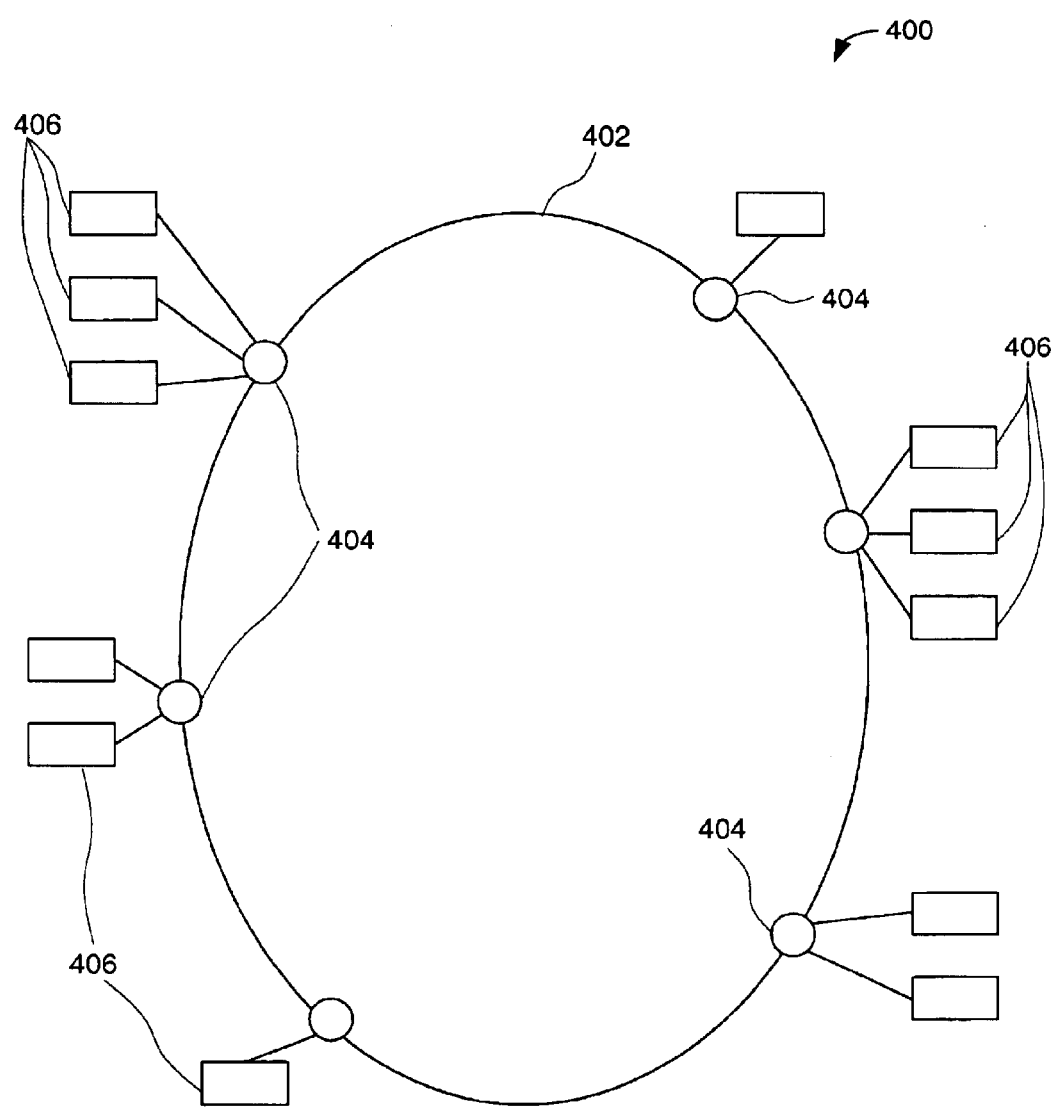
FIG. 4 is an illustration depicting a Fibre Channel Arbitrated Loop network, in accordance with an embodiment of the present invention.

FIG. 4 is an illustration depicting a Fibre Channel Arbitrated Loop network 400, in accordance with an embodiment of the present invention. The Fibre Channel Arbitrated Loop network 400 includes a Fibre Channel physical layer 402 coupling a plurality data ports 404 and network devices 406. In operation, an application transmits a device access command to the Fibre Channel Driver, which then accesses the requested device 406 via the Fibre Channel controller.

As mentioned previously, embodiments of the present invention allow existing CHIM-compatible SCSI OSMs, such as the OSMs shown in FIG. 1, to operate in the Fibre Channel network environment shown in FIG. 4 with little or no modification. This, in turn, allows existing SCSI OSM compatible applications, as shown in FIG. 1, to operate in the Fibre Channel environment. To achieve this compatibility, embodiments of the present invention use an inventive device mapping technique that allows existing applications to access devices over the Fibre Channel network 400 using SCSI based commands. Thus, embodiments of the present invention allow existing SCSI based OSMs to perceive the Fibre Channel network devices 406, and operate on the devices 406 as if the devices 406 were SCSI devices, as explained in greater detail next with reference to FIG. 5.

Figure 5:
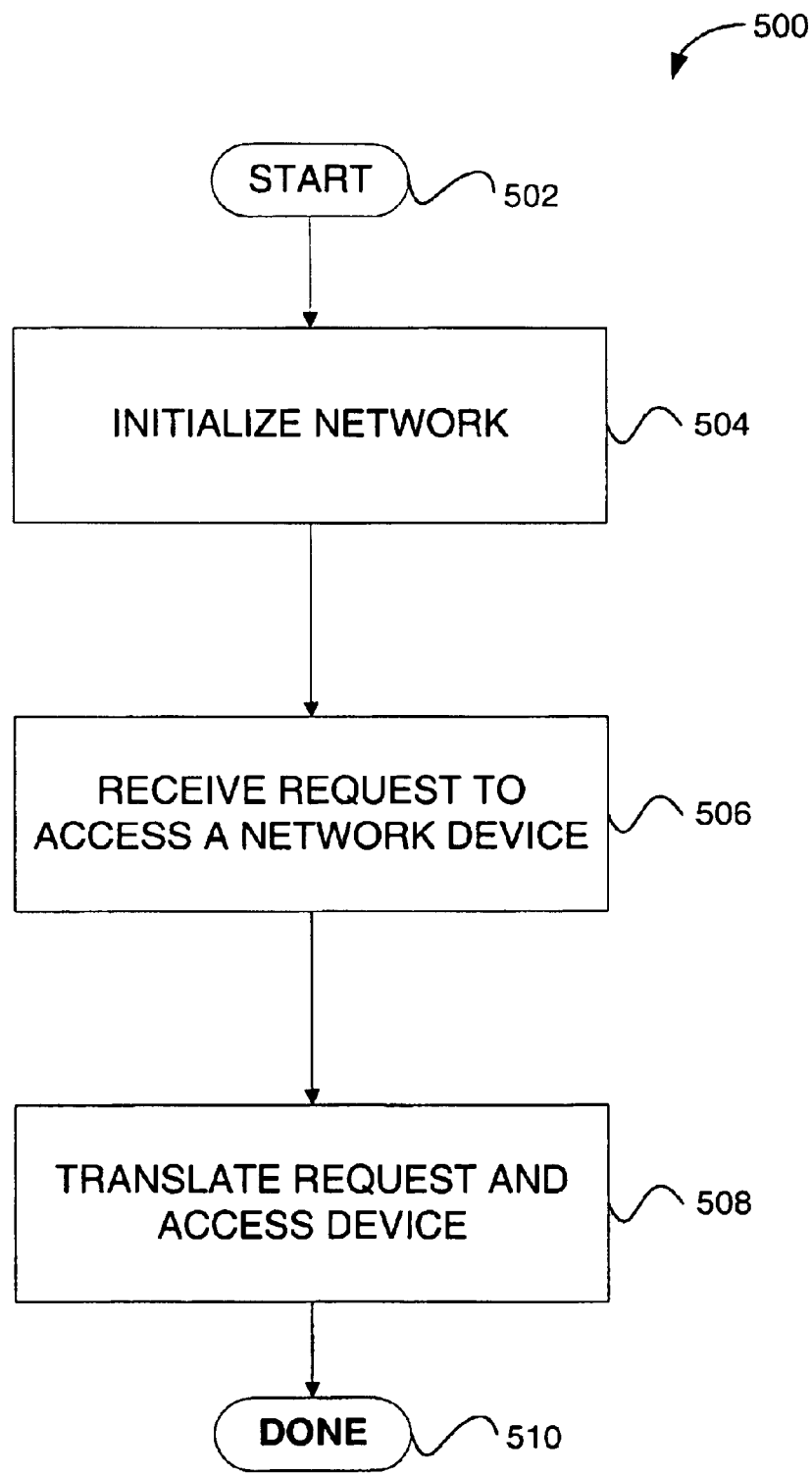
FIG. 5 is a flowchart showing a method for operating a Fibre Channel Arbitrated Loop network, in accordance with an embodiment of the present invention.

FIG. 5 is a flowchart showing a method 500 for operating a Fibre Channel Arbitrated Loop network, in accordance with an embodiment of the present invention. In an initial operation 502, preprocess operations are performed. Preprocess operations include designing the physical network layout, and other preprocess operations that will be apparent to those skilled in the art.

In an initialization operation 504, the Fibre Channel network is initialized. During network initialization, embodiments of the present invention construct an address database to facilitate device mapping between SCSI and Fibre Channel. In addition, normal Fibre Channel network initialization also occurs during the initialization operation 504.

Referring to FIG. 4, during the initialization operation an Arbitrated Loop Physical Address is generated for each connected network device 406. In addition, the data ports 404 and device 406 are assigned IDs for the address database, as discussed in greater detail subsequently. After initialization the Fibre Channel network 400 is ready to receive network device access requests.

Referring back to FIG. 5, the Fibre Channel network receives a request to access a network device, in a receiving operation 506. After the network is initialized, the network devices can be accessed using SCSI based commands, via the address database created during the initialization operation 504. As mentioned previously, application programs access network devices via the Fibre Channel driver, which includes an OSM and a FCHIM. Commands received by the OSM can be SCSI based, using a SCSI port target ID and a Logical Unit Number (LUN) ID to identify the specific device to be accessed. These received commands are then translated into Fibre Channel based commands in a translation operation 508.

In the translation operation 508, the SCSI based commands received by the Fibre Channel driver are translated into Fibre Channel based commands. The address database created during the initialization operation 504 allows embodiments of the present invention to quickly translate SCSI based commands into Fibre Channel based commands for use with the Fibre Channel network. In this manner, embodiments of the present invention allow existing SCSI OSM based applications to communicate with network devices over a Fibre Channel network.

Post-process operations are then performed in operation 510. Post-process operations include network maintenance, and other post-process operations that will be apparent to those skilled in the art. Advantageously, embodiments of the present invention allow many existing SCSI based network applications to operate over a Fibre Channel network with little or no modification to the applications or the associated OSMs.

Figure 6:
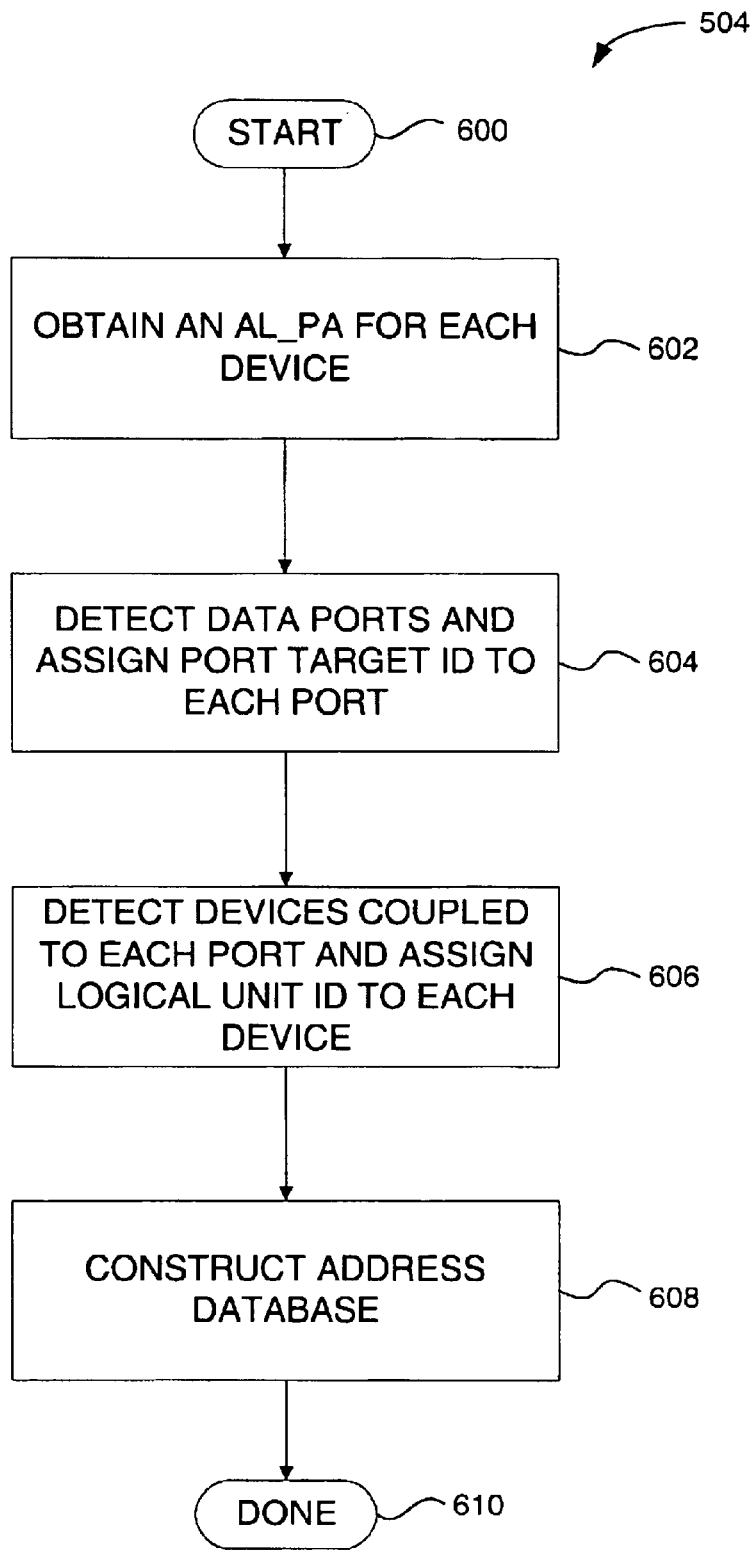
FIG. 6 is a flowchart showing a method for initializing a Fibre Channel Arbitrated Loop network, in accordance with an embodiments of the present invention.

FIG. 6 is a flowchart showing a method 504 for initializing a Fibre Channel Arbitrated Loop network, in accordance with an embodiment of the present invention. In an initial operation 600, preprocess operations are performed. Preprocess operations include configuring specific network devices to connect to the Fibre Channel Arbitrated Loop, and other preprocess operations that will be apparent to those skilled in the art.

In a Fibre Channel address operation 602, an Arbitrated Loop Physical Address is obtained for each device connected to the Fibre Channel network. In one embodiment, the Fibre Channel network is configured as a Fibre Channel, Arbitrated Loop, which is a cost-effective way of connecting plurality of data ports in a single network without the need of a Fabric switch. In a Fibre Channel Arbitrated Loop, the media is shared among the devices. Further, not all devices in the Loop are required to operate on the Arbitrated Loop, the added functionality is optional.

Before the Fibre Channel Arbitrated Loop is utilized, the Loop typically is initialized so that each port obtains an Arbitrated Loop Physical Address (AL_PA), which is a dynamically assigned value by which the ports communicate. In one embodiment, the AL_PA maps to the lowest byte of the Native Address Identifiers (D_ID and SI_ID).

In one embodiment, the Loop Initialization Primitive (LIP) sequence begins the process. Referring to FIG. 4, a network device 406 transmits the LIP after the network device 406 powers on, or when the network device 406 detects Loop Failure (loss of synchronization at its receiver). The LIP propagates around the Loop, triggering all other data ports to transmit LIPs as well.

A Loop master is then selected that controls the process of AL_PA selection. This is done by the network devices 406 constantly transmitting Loop Initialization Select Master (LISM) frames. The process is designed so that if a Fabric is present, it will become Loop master (by receiving back its own LISM frames), otherwise, the network device 406 with the numerically lowest device name generally becomes the Loop master. All other data ports propagate the higher priority LISM frames.

Each data port then selects an AL_PA. In one embodiment, the concept of an AL_PA bitmap is used, where each data port selects, and sets, a single bit in the bitmap of a frame originated by the Loop master and repeats the frame back on the Loop. Generally, there are one hundred twenty seven available bits, corresponding to the one hundred twenty seven valid AL_PAs. In one embodiment, this process is performed using four frames, breaking the selection down according to priority. In this manner, all network devices generate an AL_PA, which is obtained and stored by the Fibre Channel network 400.

Referring back to FIG. 6, data ports are detected and assigned port target identifiers, in a port ID operation 604. As mentioned previously, the present invention provides a mapping between SCSI based commands and Fibre Channel based commands. As described in greater detail below, embodiments of the present invention map the network data ports to SCSI based port target IDs.

In a device ID operation 606, network devices are detected and assigned Logical Unit IDs. Similar to the port mapping discussed above, embodiments of the present invention map the network devices to SCSI based Logical Unit IDs, generally in the form of Logical Unit Numbers (LUNs). In this manner, the device ID operation 606, in conjunction with the port ID operation 604, generate unique SCSI based identifiers for each network device for use with SCSI based device access commands.

Next, an address database is constructed, in a database operation 608. The obtained AL_PA for each device is stored in a device entry in the address database for the Fibre Channel network. In addition, the port target ID and LUN ID assigned to each device is stored in the address database device entry along with the AL_PA for each device. Thus, embodiments of the present invention provide a one to one correspondence between the Fibre Channel AL_PA used to address each device on the Fibre Channel network, and the SCSI based port target ID and LUN ID) used to access devices in a SCSI environment. In this manner, a unique port target ID and LUN ID are provided for each device for use by SCSI based applications. Therefore, when a SCSI based application requires access a network device on the Fibre Channel network, the application can use a SCSI based command having a port target ID and a LUN ID to identify the device. The Fibre Channel Driver of the present invention can then translate the port target ID and the LUN ID into a corresponding AL_PA to actually access the device on the Fibre Channel network.

Post-process operations are performed in operation 610. Post-process operations include receiving actual requests for access to the network devices, and other post-process operations that will be apparent to those skilled in the art. Advantageously, embodiments of the present invention allow SCSI based applications to access a network device on the Fibre Channel network using a SCSI based command having a port target ID and a LUN ID to identify the device. The Fibre Channel Driver of the present invention can then translate the port target ID and the LUN ID into a corresponding AL_PA to actually access the device on the Fibre Channel network.

Figure 7:
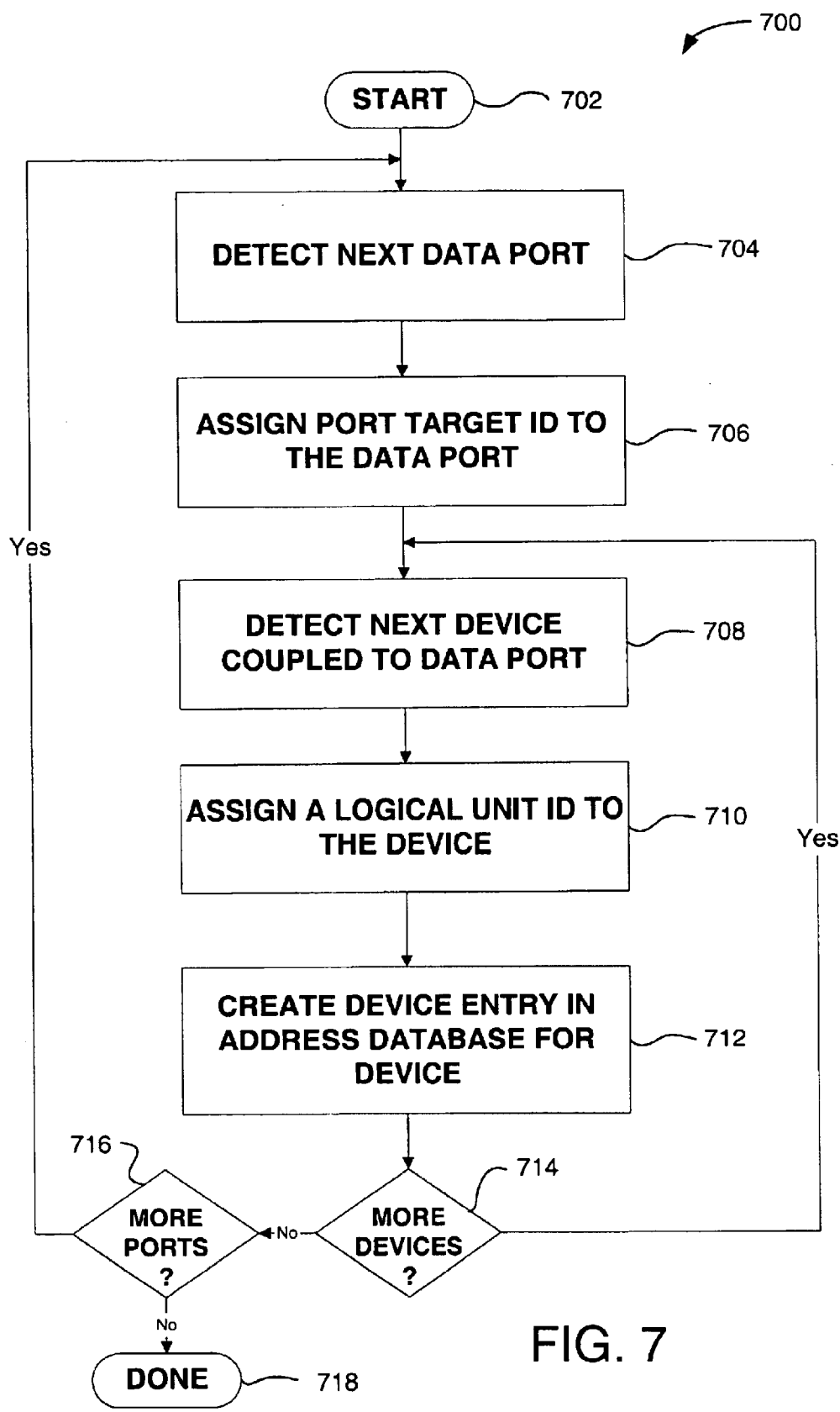
FIG. 7 is a flowchart showing a method for assigning SCSI based identifiers to ports and devices in a Fibre Channel network, in accordance with an embodiment of the present invention.

FIG. 7 is a flowchart showing a method 700 for assigning SCSI based identifiers to ports and devices in a Fibre Channel network, in accordance with an embodiment of the present invention. In an initial operation 702, preprocess operations are performed. Preprocess operations include obtaining an AL_PA for devices coupled to the network, and other preprocess operations that will be apparent to those skilled in the art.

In a data port detection operation 704, the next data port in the Fibre Channel network is detected. Referring to FIG. 4, during the data port detection operation 704, the system detects a data port 404 on the Fibre Channel network. The actual data port 404 detected by the system varies depending on the layout of the Fibre Channel network 400.

Referring back to FIG. 7, in a data port ID operation 706, the detected data port is assigned a port target ID. As mentioned previously, the present invention provides a mapping between SCSI based commands and Fibre Channel based commands. To provide the mapping, embodiments of the present invention assign port target IDs to each detected port in the Fibre Channel network. Although a Fibre Channel network generally does not use a port target ID to address a device, SCSI based, network applications do use port target IDs to address network devices. Thus, embodiments of the present invention generate a SCSI based address for each network device and correlate the generated SCSI based address with the actual AL_PA for each network device.

In a device detection operation 708, the system detects the next device coupled to the detected data port. Referring to FIG. 4, an embodiment of the present invention queries each newly detected data port 404 to determine the number of devices 406 that are coupled to the data port 404. Then, during the device detection operation 708, a device 406 that is coupled to the data port 404 is detected and queried to determine the device's AL_PA and other characteristics that identify the device 406, such as the hardware type of the device.

Referring back to FIG. 7, the detected device is assigned a Logical Unit ID, in a device ID operation 710. In one embodiment, each detected device is assigned a Logical Unit ID, such as a LUN, based on the order the device was detected. For example, the first detected device coupled to a particular data port may be assigned a LUN of 0, and the next detected device coupled to the same data port may be assigned a LUN of 1. In this manner, each device coupled to the Fibre Channel network is assigned both a Fibre Channel AP_PA and unique SCSI based identifier having a port target ID and a LUN.

Next, in an address database construction operation 712, the device information is used to create a device entry in an address database. In one embodiment, the address database includes device information on each device coupled to the network. This information includes the device type and the device address. As described above, the device address actually comprises two device addresses for each device. One address is a Fibre Channel AL_PA, the other is a SCSI based address having a port target ID and a LUN. After obtaining a device's AL_PA, the system enters the AL_PA in a device entry for the device. In addition, after assigning a device's port target ID and LUN, the port target ID and LUN are entered into the device entry for the device.

A decision is then made as to whether more devices are coupled to the current port, in operation 714. If more devices are coupled to the current port, the method 700 continues with another device detection operation 708, otherwise the method 700 continues with operation 716.

A decision is made as to whether more ports are coupled to the Fibre Channel network, in operation 716. If more ports are coupled to the Fibre Channel network, the method continues with another data port detection operation 704. Otherwise, the method 700 is completed in operation 718.

Post-process operations are performed in operation 718. Post-process operations include receiving device access commands and other post-process operations that will be apparent to those skilled in the art. In this manner, embodiments of the present invention can provide an address mapping between SCSI and Fibre Channel by corresponding a device's AL_PA to an assigned SCSI based address having a port target ID and LUN.

Figure 8:
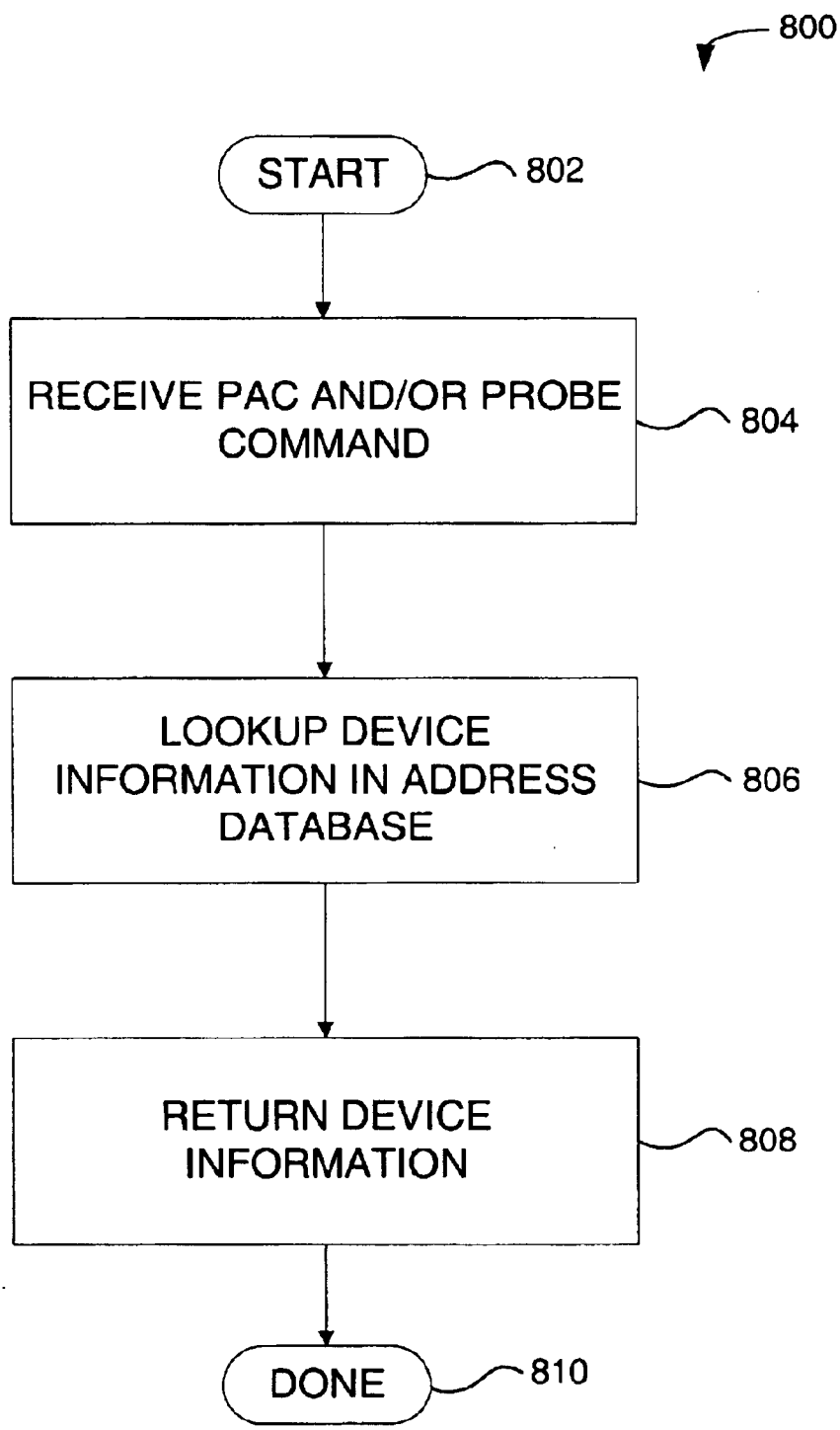
FIG. 8 is a flowchart showing a method for performing a Protocol Auto Configuration and a Probe operation, in accordance with an embodiment of the present invention.

FIG. 8 is a flowchart showing a method 800 for performing a Protocol Auto Configuration (PAC) and a Probe operation, in accordance with an embodiment of the present invention. To gain information about specific devices, conventional SCSI based network systems typically perform a PAC and Probe operation. The PAC operation is used to actually locate the device on the network, while the Probe operation is used to officially obtain information about the device. Conventionally, these operations were very time consuming because data had to actually travel out to the particular device and back every time these operations were performed. Embodiments of the present invention greatly increase the efficiency of these commands through the use of the address database.

The method 800 begins with an initial operation 802 wherein preprocess operations are performed. Preprocess operations include initializing the Fibre Channel network and other preprocess operations that will be apparent to those skilled in the art.

In a receiving operation 804, a PAC and/or Probe command is received. As mentioned previously, a SCSI based network uses PAC and Probe operations to obtain information about specific devices couple to the network. To allow existing applications to properly function over the Fibre Channel network, embodiments of the present invention support the SCSI based PAC and Probe commands. However, embodiments of the present invention perform these operations in a far more efficient manner than in a conventional SCSI based network.

In a lookup operation 806, the system looks up the requested device information in the address database. As mentioned previously, embodiments of the present invention create an address database during the initialization of the Fibre Channel network. The address database includes a mapping between the Fibre Channel based AL_PA and a SCSI based port target ID and LUN for each device coupled to the Fibre Channel network. Each device entry in the address database also; includes other information concerning the related device, such as the device type. As a result, after initialization the address database preferably includes information for each network device that may be requested by PAC and Probe commands. Thus, during the lookup operation 806, the above-described information is obtained from the address database for the device requested by the PAC or Probe command.

Next, in a return operation 808, the requested information is returned to the calling application. Having obtained the PAC and Probe information in the lookup operation 806, the system returns the device information to the requesting application during the return operation 808. In this manner, embodiments of the present invention can provide the same information that is provided in a conventional SCSI based network system in response to a PAC or Probe command.

Advantageously, embodiments of the present invention can return this information to the requesting PAC or Probe command much quicker than can a conventional SCSI based network system because embodiments of the present invention store the requested information in an address database. As a result, the information can be obtained by performing a table lookup, instead of actually searching for, and querying the device as in a conventional SCSI based network. Moreover, although the PAC and Probe commands are SCSI based, embodiments of the present invention are capable of providing PAC and Probe information over a Fibre Channel based network.

Post-process operations are performed in operation 810. Post-process operations include awaiting further network commands, and other post-process commands that will be apparent to those skilled in the art. Advantageously, by storing device information during initialization, embodiments of the present invention can provide device information in a much more efficient manner than is possible using a conventional SCSI based network system.

As mentioned previously, embodiments of the present invention utilize a Fibre Channel Driver comprised of an OSM and a FCHIM to provide a mapping between SCSI and Fibre Channel. In addition to the increased flexibility provided by having interchangeable modules, the separation of the OSM and FCHIM also enhances driver development and upgradability. Essentially, when one module of the Fibre Channel driver is upgraded or further developed, the other module is preferably treated as a "black box" by the module developer. However, there are occasions when a developer of an OSM may need to configure characteristics of the Fibre Channel Controller that are generally only accessible by the FCHIM module. Embodiments of the present invention use a Profile data structure to facilitate this type of control while still allowing the FCHIM to remain a "black box" to the OSM developer.

Figure 9:
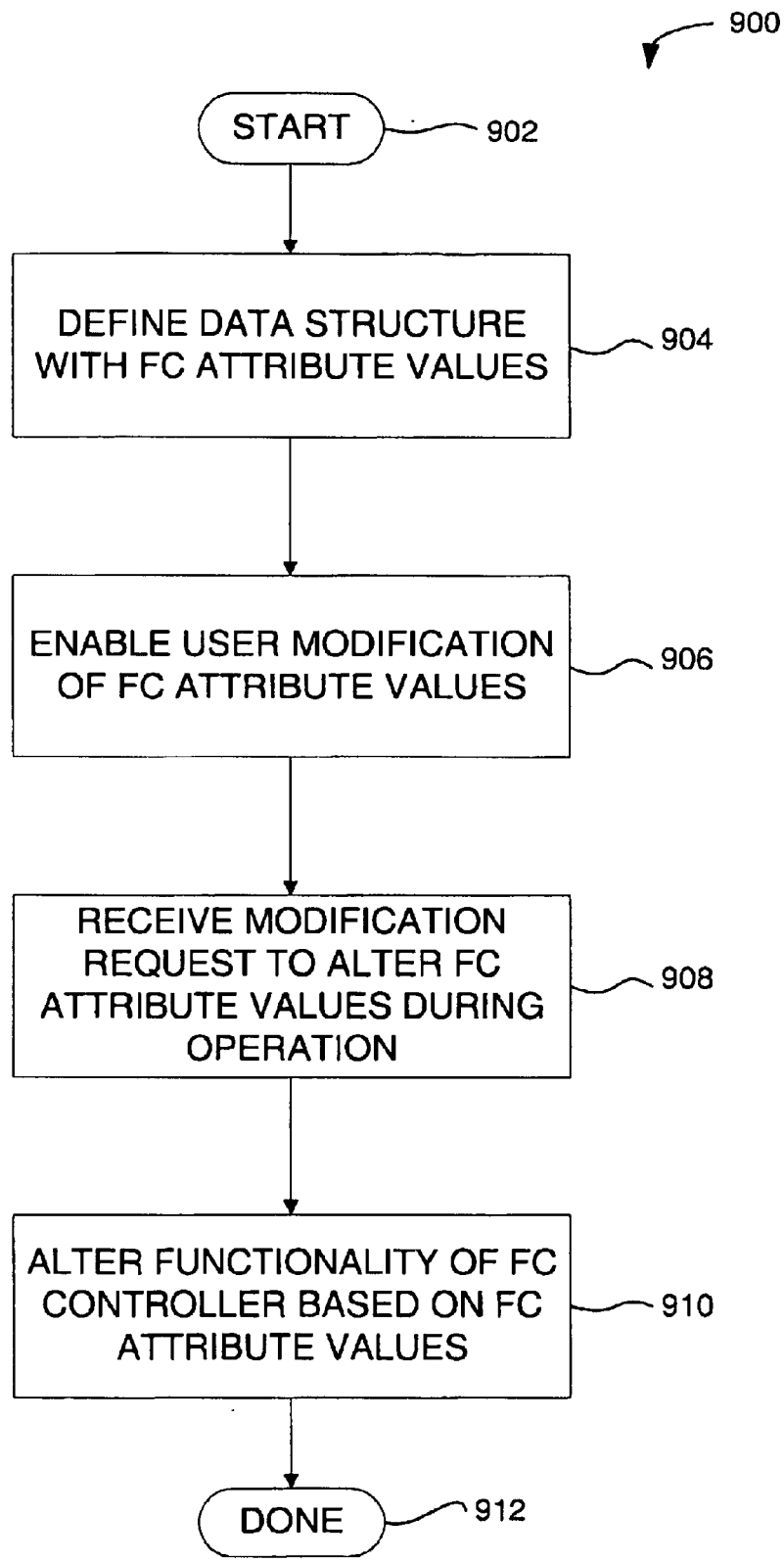
FIG. 9 is a flowchart showing a method for facilitating communication with the Fibre Channel Common Interface Module using a Profile, in accordance with an embodiment of the present invention.

FIG. 9 is a flowchart showing a method 900 for facilitating communication with the Fibre Channel Common Interface Module using a Profile, in accordance with an embodiment of the present invention. In an initial operation 902, preprocess operations are performed. Preprocess operations include initial OSM development and other preprocess operations that will be apparent to those skilled in the art.

In a data structure defining operation 904, a data structure is defined comprising Fibre Channel attribute values. As mentioned previously, the FCHIM Interface provides a level of abstraction for the OSM by hiding the physical details of the FCHIM and underlying hardware to simplify OSM code. However, there are cases when such physical details need to be known, and perhaps altered. The FCHIM provides a profile structure for this purpose, as shown next with reference to FIG. 10.

Figure 10:
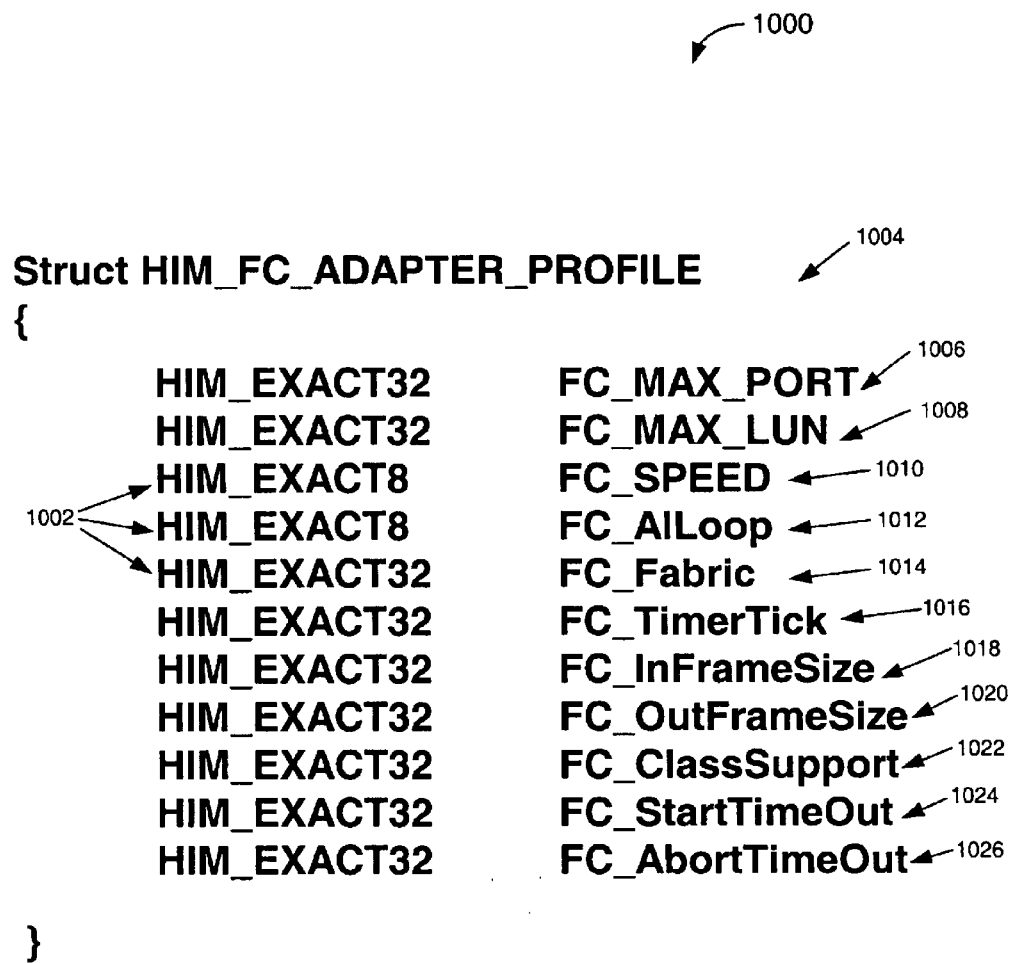
FIG. 10 is an illustration showing an exemplary Profile data structure, in accordance with an embodiment of the present invention.

FIG. 10 is an illustration showing an exemplary Profile data structure 1000, in accordance with an embodiment of the present invention. The exemplary Profile data structure 1000 includes data type values 1002 and Fibre Channel value fields 1004. The data type values 1002 are generally used to define the type of data that can be input into the Fibre Channel value fields 1004.

The Fibre Channel value fields 1004 are used to define specific characteristics of the Fibre Channel controller. Exemplary fields include a Fibre Channel maximum port number 1006, a Fibre Channel maximum LUN count 1008 and a Fibre Channel speed value 1010. In addition, the Profile 1000 can include a Fibre Channel Arbitrated Loop value 1012 indicating whether the network includes an Arbitrated Loop configuration, a Fibre Channel Fabric value 1014 indicating whether the network includes a Fabric configuration, and a Fibre Channel Timer Tick value 1016. Other values that can be included in the Profile structure 1000 are an In Frame Size 1018, an Out Frame Size value 1020, a Class Support value 1022, a Start Time Out value 1024, and an Abort Time Out value 1026.

Referring back to FIG. 9, a user is allowed to modify the Fibre Channel attribute values, in a user modification operation 906. Using the Profile structure 1000, the characteristics of the Fibre Channel controller can be modified both at the time of OSM development, and during operation of the Fibre Channel controller. As such, one embodiment of the present invention allows an OSM developer to hard code some of the characteristics of the Fibre Channel controller when creating the OSM. In addition, the OSM can modify the characteristics during operation of the controller, as described next with respect to an OSM modification operation 908.

During network operation, a request can be received from the OSM to alter specific Fibre Channel characteristics, in the OSM modification operation 908. Embodiments of the present invention allow the OSM to adjust specific fields in the Profile structure to change the controller behavior. In one embodiment, the controller returns a binary mask, in the form of the Profile, indicating which fields are modifiable by the OSM. The OSM then makes a function call to make desired changes to the Profile. Target and Node Profiles can also be created that have similar calls. Profiles can be read at any time. Preferably, modification requests are made when the entity being altered is idle, so that the FCHIM does not need to change behavior halfway through a particular operation.

The functionality of the Fibre Channel controller is then altered based on the Fibre Channel attribute values, in a controller altering operation 910, and post-process operations are performed in operation 912. Advantageously, using the Profile structure, embodiments of the present invention can facilitate communication between the OSM and the Fibre Channel controller while still allowing the FCHIM to remain a "black box" to the OSM developer. Moreover, the Profile Structure allows the OSM to continue to alter the characteristics of the Fibre Channel controller during operation of the Fibre Channel network.

The design and implementation of a Fibre Channel device driver of the present invention can be a large, multi-person, effort. To accomplish this project, embodiments of the present invention separate the design and implementation of the Fibre Channel driver down into smaller tasks on which small groups of people can work. To reduce cost and development time, the numerous component pieces of the Fibre Channel Driver preferably are amenable to construction of the larger whole with a minimum of conflict of the parameters and operation of the various pieces.

In the present invention, each code module preferably includes a known interface. A code module's interface defines the way in which other modules send data to and receive data from the module. Current preprocessed languages, of which C and C++ are examples, provide a great deal of flexibility to users in the definition of customized interfaces. To utilize a preexisting module of code, a developer includes in a code module a reference to a header file for the preexisting code module and specifies certain characteristics for that module. At compile time, the header files are compiled according to the characteristics specified by the developer and the required interface between the developer's program and the preexisting module of code is defined.

As mentioned previously, the modular nature of the embodiments of the present invention provide increased flexibility and efficiency when upgrading or modifying a Fibre Channel driver. To take advantage of the modular nature of the present invention, embodiments use a layer structure for Fibre Channel driver creation and modification.

Figure 11:
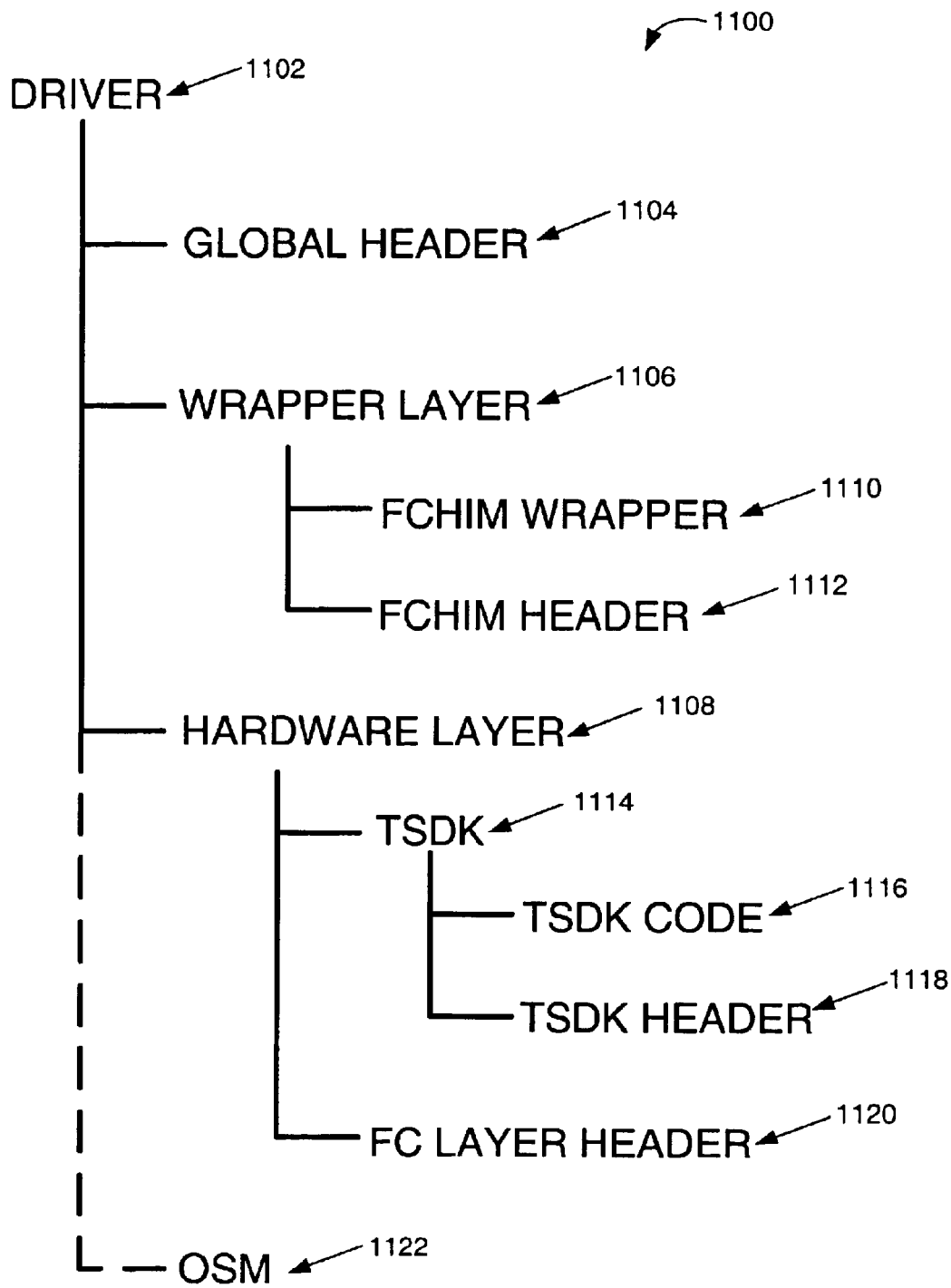
FIG. 11 is an illustration showing a layer structure for creating Fibre Channel controller software, in accordance with an embodiment of the present invention.

FIG. 11 is an illustration showing a layer structure 1100 for creating Fibre Channel controller software, in accordance with an embodiment of the present invention. The layer structure 1100 includes a driver directory 1102. Within the driver directory 1102 is a global header directory 1104, a wrapper layer directory 1106, and a hardware layer directory 1108. Within the wrapper layer directory 1106 is a FCHIM wrapper directory 1110 and a FCHIM header directory 1112. Within the hardware directory 1108 can be a TDSK directory 1114 having a TDSK code directory 1116 and a TDSK header directory 1118, and a Fibre Channel layer directory 1120.

The layer structure 1100 of the present invention allows for separate compiling of the various components of the Fibre Channel driver. In particular, the code included in the hardware layer directory 1108 can be upgraded and compiled separately, and later linked with existing object files for the wrapper layer and OSM. This allows for isolation of programming errors resulting from new code additions and decreases compiling time by reducing the amount of code that must be compiled to upgrade the Fibre Channel driver.

The global header directory 1104 includes global header files accessible by code in both the wrapper layer directory 1106 and the hardware layer directory 1108. In addition to having a single source for many global variables and variable types, the global header directory 1104 allows the driver developer to provide default values for variables used in other code segments.

In one embodiment of the present invention, the "inheritance" property of the C language header files is used to provide default values. Inheritance occurs when one object or file derives some of its contents by virtual copying from another object or file. In the case of C header files, inheritance occurs when one header file includes another header file and then replaces or adds to the variable definitions in the first header file.

If the inheriting header file and the base headers file have different names, embodiments of the present invention can provide inheritance by including the following line in the inheriting file header file: '#include "base".'

When using the same name for the inheriting file and the base file, different procedures may be used. For example, the FCHIM code module may use a global signal header file '/global header/signal.h.' However, the version of '/global header/signal.h' may not perform as the FCHIM code module expects. In this case, the developer can define a "local" version of the signal header file, such as '/wrapper layer/ FCHIM header/signal.h.' This header file is then used to override or add to the one supplied by the system.

In many C language compilers this is accomplished by compiling with the option '–I.', and writing a file 'wrapper layer/FCHIM header/signal.h' that does what the application program expects.

As shown in FIG. 11, the wrapper layer directory 1106 includes both the FCHIM wrapper directory 1110 and the FCHIM header directory 1112. The FCHIM wrapper directory 1110 includes FCHIM wrapper source code, while the FCHIM header directory 1112 includes FCHIM header files for the FCHIM wrapper source code. The FCHIM header files typically include many of the same variables that are defined in the header files in the global header directory 1104.

In one embodiment, variables defined at lower levels of the layer structure 1100 take precedence over the same variables defined at higher levels of the layer structure 1100. Thus, a variable defined in a FCHIM header file will supersede the variable definition in a header file in the global header directory 1104, including value assignments to the variable. In this manner, variable values assigned in a FCHIM header file can override default variable values assigned in a header file in the global header directory 1104.

The hardware directory 1108 generally includes the TDSK directory 1114 having a TDSK code directory 1116 and a TDSK header directory 1118. The hardware directory also includes the Fibre Channel layer directory 1120. These directories include software that actually controls the Fibre Channel controller. As stated previously, a FCHIM of the present invention generally includes a FCHIM wrapper layer module and a fcLayer module. The FCHIM wrapper layer module translates FCHIM commands from the various OSMs into commands for the fcLayer module. The software code for the fcLayer module is included in the hardware directory 1108, including the various subdirectories of the hardware directory 1108.

Using the layer structure 1100 of the present invention, different software developers can easily develop and integrate the various modules of the Fibre Channel driver of the present invention. For example, the manufacture of the Fibre Channel controller may have the best knowledge of the controller, an d thus be best suited to write the physical fcLayer software for that controller. Another manufacture may be best suited to create the interface between the various applications and the fcLayer software.

In this case, the first manufacture could create the fcLayer software and store the software in the hardware directory 1108. The second manufacture could then create the OSM and FCHIM wrapper layer module. The FCHIM wrapper layer module software code could be stored in the wrapper layer directory 1106, while the OSM software code could be stored in an OSM directory 1122. Definitions and Variables common to both modules could be stored in the global header directory 1104. The fcLayer and FCHIM wrapper layer could then be linked together forming the Fibre Channel driver.

As mentioned above, an OSM directory 1122 optionally may be included in the layer structure 1100. Similar to the wrapper layer directory 1106, the OSM directory 1122 can include an operating system specific OSM directory and an OSM header directory. The operating system specific OSM directory can include operating system specific OSM source code, such as WINDOWS 95 OSM source code. The OSM header directory could include OSM header files for the operating system specific OSM source code. As with the FCHIM header files, the OSM header files typically include many of the same variables that are defined in the header files in the global header directory 1104.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for mapping a Fibre Channel address to a Small Computer System Interface (SCSI) address, comprising the operations of:

constructing an address database having a device entry for a detected device during Fibre Channel initialization, wherein the device entry includes a port target identifier for a detected data port and a logical unit identifier for the detected device, and wherein the device entry associates an Arbitrated Loop Physical Address (AL_PA) to the port target identifier and the logical unit identifier;

translating a received command from a particular operating system into an operating system independent command utilizing an Operating System Module (OSM), the OSM being designed to execute on the particular computer operating system;

translating the operating system independent command into a Fibre Channel command utilizing the address database and a Fibre Channel wrapper module; and providing the Fibre Channel command to a Fibre Channel Layer Module that is in communication with the Fibre Channel wrapper module and a Fibre Channel controller.

2. A method as recited in claim 1, further comprising the operation of determining whether more than one device is coupled to the data port.

3. A method as recited in claim 2, further comprising the operation of detecting a second device coupled to the data port.

4. A method as recited in claim 3, further comprising the operation of assigning a second logical unit identifier to the second detected device.

5. A method as recited in claim 1, further comprising the operation of receiving a device access command having the port target identifier of the data port and the logical unit identifier of the device.

6. A method as recited in claim 5, further comprising the operation of correlating the port target identifier and the logical unit identifier with the AL_PA using the address database.

7. A method as recited in claim 6, further comprising the operation of accessing the device using the AL_PA.

8. An address database for mapping a Fibre Channel address to a Small Computer System Interface (SCSI) address, comprising:

a port target identifier related to a data port;

a logical unit identifier related to a device, wherein the device is coupled to the data port;

an Arbitrated Loop Physical Address (AL_PA) related to the device; and a plurality of device entries, the port target identifier, the logical unit identifier, and the AL_PA being part of a first device entry, and each device entry further includes a device type information related to the device, wherein the address database facilitates translation of operating system independent commands received by a Fibre Channel wrapper module into Fibre Channel commands usable by a Fibre Channel layer module that is in communication with a Fibre Channel controller.

9. An address database as recited in claim 8, wherein each device entry further includes additional information concerning a related device.

10. An address database as recited in claim 8, wherein the device is accessed on a Fibre Channel network using the AL_PA related to the device.

11. An address database as recited in claim 10, wherein the AL_PA for the device is returned in response to receiving a command having the port target identifier and the logical unit identifier related to the device.

12. A computer program that maps a Fibre Channel address to a Small Computer System Interface (SCSI) address, comprising:

a code segment that constructs an address database having a device entry for a detected device during Fibre Channel initialization, wherein the device entry includes a port target identifier for a detected data port and a logical unit identifier for the detected device, and wherein the device entry associates an Arbitrated Loop Physical Address (AL_PA) to the port target identifier and the logical unit identifier;

a code segment that receives an operating system independent command from an Operating System Module (OSM) that is designed to execute on a particular computer operating system; and a code segment that translates the operating system independent command into a Fibre Channel command utilizing the address database, the Fibre Channel command being usable by a Fibre Channel layer module.

13. A computer program as recited in claim 12, further comprising a code segment that determines whether more than one device is coupled to the data port.

14. A computer program as recited in claim 13, further comprising a code segment that detects a second device coupled to the data port.

15. A computer program as recited in claim 14, further comprising a code segment that assigns a second logical unit identifier to the second detected device.

16. A computer program as recited in claim 12, further comprising a code segment that receives a device access command having the port target identifier of the data port and the logical unit identifier of the device.

17. A computer program as recited in claim 16, further comprising a code segment that correlates the port target identifier and the logical unit identifier to the AL_PA using the address database.

* * * * *